United States Patent [19]

Ose

[11] Patent Number: 5,676,022

[45] Date of Patent: Oct. 14, 1997

[54] CHANGE-SPEED CONTROL APPARATUS FOR A BICYCLE

[75] Inventor: Kenji Ose, Sakai, Japan

[73] Assignee: Shimano Inc., Osaka, Japan

[21] Appl. No.: 612,762

[22] Filed: Mar. 8, 1996

Related U.S. Application Data

[63] Continuation of Ser. No. 170,900, Dec. 21, 1993, abandoned.

[30] Foreign Application Priority Data

Dec. 28, 1992 [JP] Japan ................................. 4-089182

[51] Int. Cl.$^6$ .............................. F16C 1/10; G05G 11/00
[52] U.S. Cl. .............................. 74/502.2; 74/489
[58] Field of Search ........................... 74/489, 502.2, 74/527, 531, 575, 577 R, 577 M, 577 S

[56] References Cited

U.S. PATENT DOCUMENTS

| 5,012,692 | 5/1991 | Nagano | 74/475 |
|---|---|---|---|
| 5,186,072 | 2/1993 | Nagano | 74/489 X |
| 5,203,213 | 4/1993 | Nagano | 74/489 X |
| 5,213,006 | 5/1993 | Nagano | 74/502.2 |
| 5,241,878 | 9/1993 | Nagano | 74/502.2 |
| 5,287,766 | 2/1994 | Nagano | 74/502.2 |
| 5,307,706 | 5/1994 | Nagano | 74/502.2 |

FOREIGN PATENT DOCUMENTS

| 371254 | 6/1990 | European Pat. Off. | 74/502.2 |
|---|---|---|---|
| 509457 | 10/1992 | European Pat. Off. | 74/502.2 |
| 552775 | 7/1993 | European Pat. Off. | 74/502.2 |
| 40 33 890 A1 | 10/1990 | Germany | 74/502.2 |
| 4033890 | 4/1992 | Germany | 74/489 |

*Primary Examiner*—Vinh T. Luong

[57] ABSTRACT

A change-speed control apparatus for a bicycle includes a fixing member for fixing the control apparatus to a bicycle frame, a winder member pivotable to wind a change-speed control cable and urged in a cable unwinding direction, a change-speed control lever for pivoting the takeup element and a position hold mechanism for holding the winder member in position at one of a plurality of speed positions. The apparatus further includes a first release control unit for allowing the takeup element to pivot in the cable unwinding direction by an amount corresponding to one speed position, a second release control unit for allowing the takeup element to pivot in the cable unwinding direction to a predetermined one of the speed positions, and a release lever provided independently of the change-speed control lever for actuating the second release control unit.

24 Claims, 11 Drawing Sheets

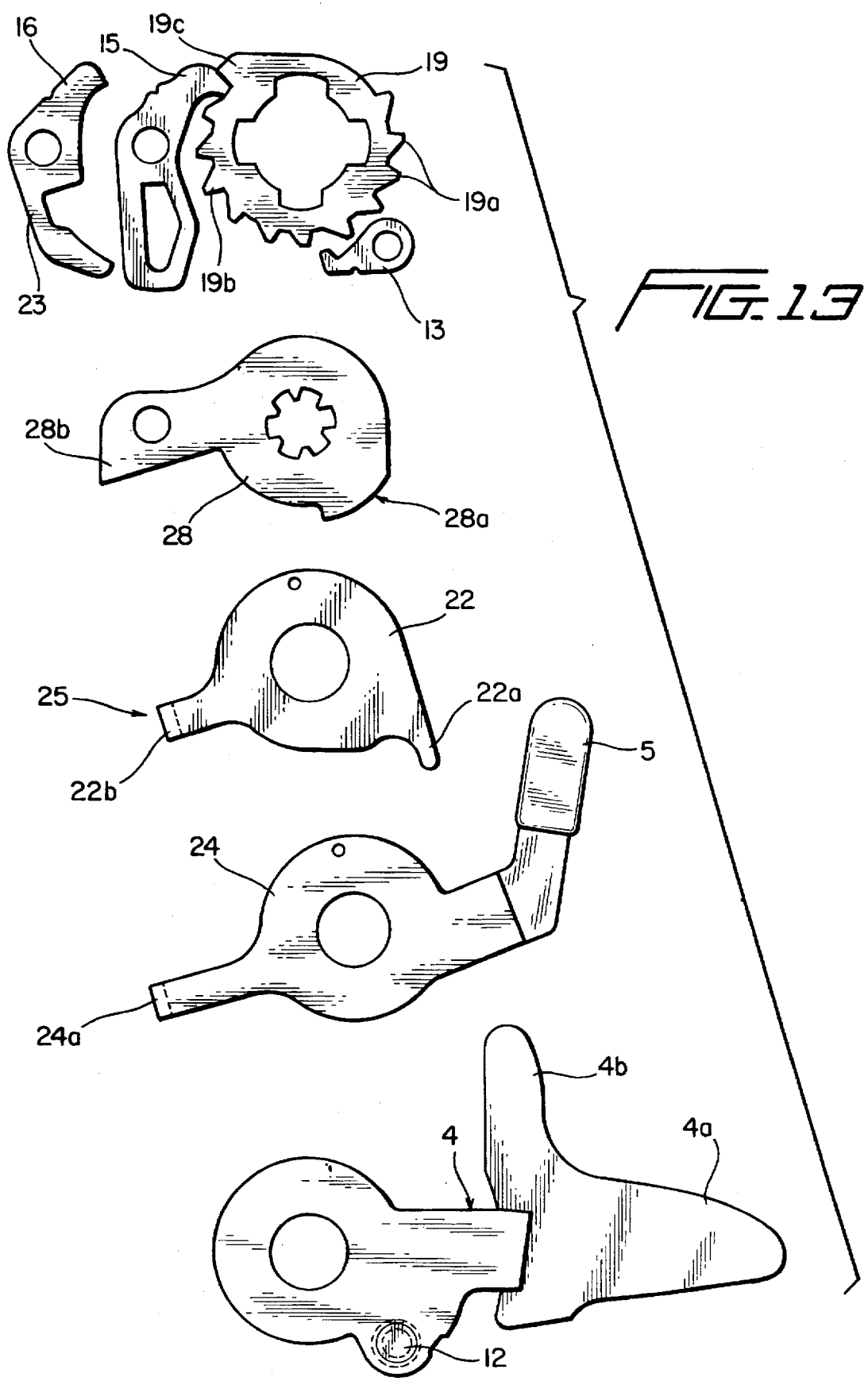

CHANGE-SPEED CONTROL APPARATUS FOR A BICYCLE

This application is a continuation of application Ser. No. 08/170,900, filed Dec. 21, 1993, now abandoned.

BACKGROUND OF THE INVENTION

1. Field of the Invention

The present invention relates to a change-speed control apparatus for controlling a bicycle derailleur. In particular, the present invention relates to a change-speed control apparatus equipped with a shift lever, a position retaining mechanism, and two separate release control mechanisms that disengages the position retaining mechanism.

2. Description of the Related Art

As a conventional art pertinent to the present invention, a change-speed control apparatus for a bicycle is disclosed in U.S. Pat. No. 5,241,878. This apparatus includes a takeup element for winding a change-speed control cable, a position retaining mechanism for holding the takeup element in a position at a desired one of a plurality of speed positions, and a release lever for releasing the position retaining mechanism to unwind the control cable by an amount corresponding to one speed position. There is also a change-speed control apparatus which comprises an improvement over the above-described convention. This apparatus is capable of selectively allowing the winder member to wind the cable by an amount corresponding either to one speed position or to a plurality of speed positions, depending on an operation amount of the release lever.

In the case of the first convention, the operation amount of the release lever fixedly corresponds to one speed position. Then, if a speed shift over greater than two speed positions are called for, the lever needs to be operated for a number of times corresponding to the number of speed positions between the initial position to the final position. For instance, if a cyclist stops the bicycle at the end of a downhill and then starts it again, he/she will change the speed position to the lowest speed position to start. On such occasion, the above-described mechanical limitation presents inconvenience to the cyclist.

In the case of the second convention, although the apparatus allows the cyclist to change at once to a desired position which is more than two steps lower to the initial position, the cyclist will find it very difficult to operate the release lever by an appropriate amount needed for the change-over operation to the target speed position.

SUMMARY OF THE INVENTION

A primary object of the present invention is to provide a change-speed control apparatus which allows the cyclist to readily and reliably effect a change-speed operation over two or more speed chage positions in one stroke. Desirablly, the apparatus would allow a facilitated change-over operation to a predetermined lower speed position, e.g. the lowest speed position for starting. A further object of the invention is to provide a change-speed apparatus of the above type having one mechanism for allowing a single step change-speed operation and another separate mechanism for allowing one-stroke shifting to a predetermined lower speed position. For fulfilling the above-noted objects, a change-speed control apparatus according to the present invention comprises, a fixing member, a takeup element pivotable to wind a change-speed control cable, the takeup element being urged in a cable unwinding direction, a position hold mechanism for holding said winder member in position at one of a plurality of speed positions, a position-hold release means for releasing said position hold mechanism, a change-speed control means operable to pivot said takeup element, and operable also to actuate said position-hold release means. The position-hold release means includes a first release control means for allowing said winder member to pivot in the cable unwinding direction by an amount corresponding to one speed position, and a second release control means for allowing said winder member to pivot in the cable unwinding direction to a predetermined one of the speed positions.

The change-speed control apparatus having the above-described construction allows the one-stroke, multi-step shifting to the predetermined speed position in a reliable and easy manner by operation of the release lever and allows also the single-step shifting just like the conventional apparatuses described hereinbefore. Further and other objects, features and effects of the invention will become more apparent from the following more detailed description of the embodiments of the invention with reference to the accompanying drawings.

BRIEF DESCRIPTION OF THE DRAWINGS

FIG. 13 is an exploded view showing essential components of the change-speed control apparatus of the invention.

DETAILED DESCRIPTION OF THE PREFERRED EMBODIMENTS

Figure 1:
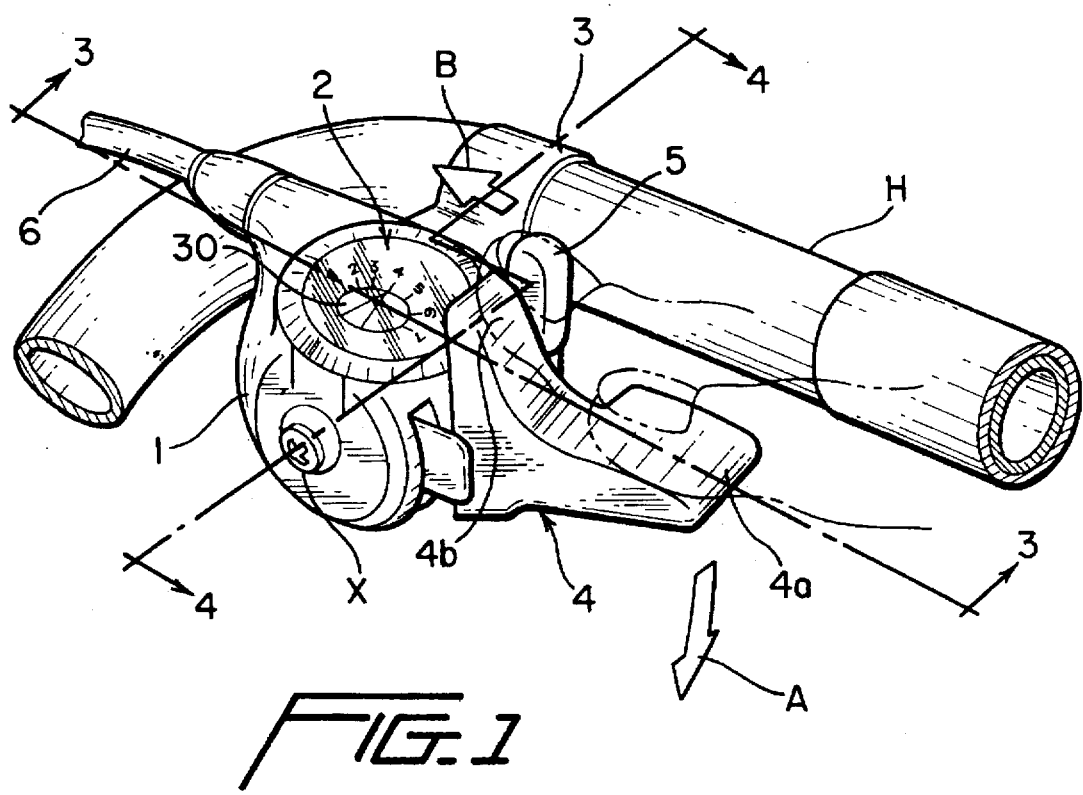
FIG. 1 is a perspective view showing a change-speed control apparatus according to the present invention.

Preferred embodiments of a change-speed control apparatus for a bicycle according to the present invention will now be described in details with reference to the accompanying drawings. As shown in FIG. 1, a change-speed control apparatus of the invention includes an apparatus body having a body cover 1 and an indicator unit 2. The apparatus body is attached to a handle bar H of a bicycle by means of an attaching or fixing member 3. The apparatus further includes a change-speed control lever 4 and a release lever 5 which are pivotable about a common axis X. In this preferred embodiment, the apparatus is adapted to provide seven different speeds, with the indicator unit being adapted therefor also.

Figure 3:
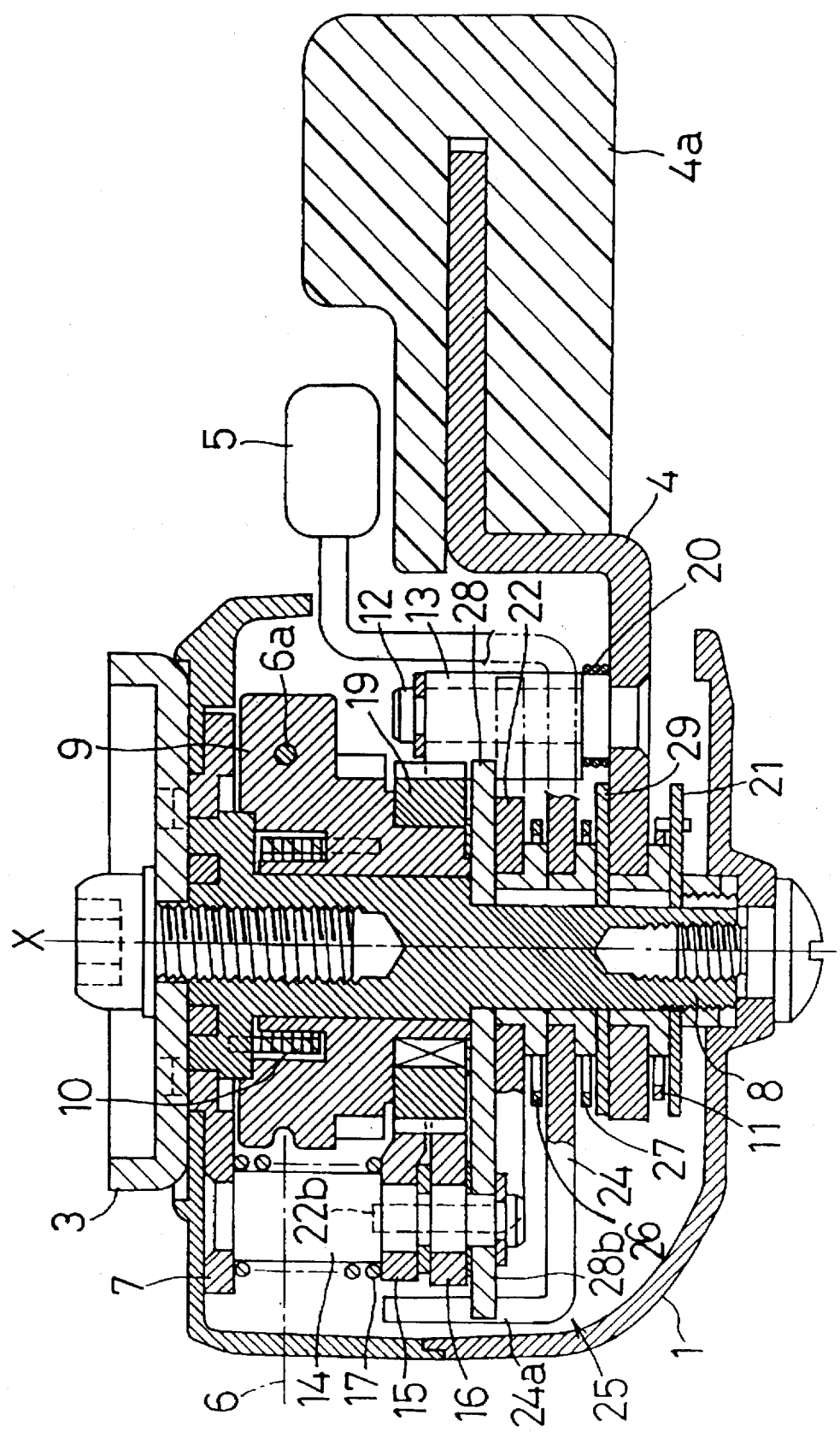
FIG. 3 is a plane view of the apparatus of FIG. 1 in a horizontal section along line 3—3 in FIG. 1, including an X axis.
Figure 4:
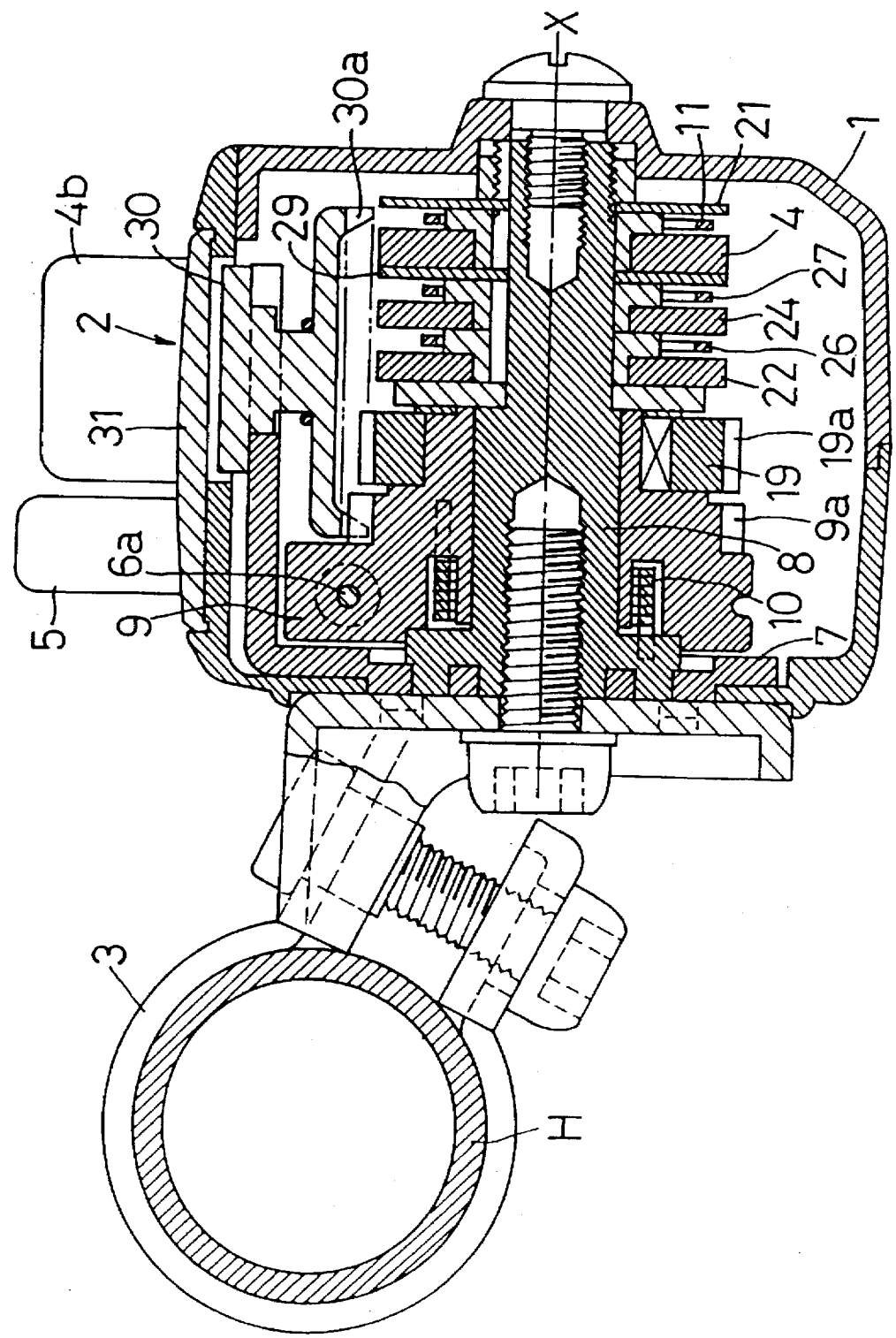
FIG. 4 is a left front side view of the apparatus of FIG. 1 in a vertical section along line 4—4 in FIG. 1, including the X axis.

This change-speed control apparatus is operatively connected via a change-speed control cable 6 to an unillustrated bicycle derailleur. In operation, as a first control portion 4a of the change-speed control lever 4 is pivoted in a first direction A, an inner cable 6a of the control cable 6 is pulled and wound into the apparatus. Conversely, when a second control portion 4b of the same control lever 4 is pivoted in a second direction B or when the release lever 5 is pivoted in this direction B, the inner cable 6a is unwound from the apparatus. The indicator unit 2 indicates, for the cyclist's visual confirmation, at which of the seven speed positions the derailleur is presently located. The change-speed control apparatus will be described in further details next. As shown in FIGS. 3 and 4, a base member 7 is disposed immediately inside the body cover 1. This base member 7 is connected to the attaching member 3, so that the base member 7 is secured to the handle bar H via the attaching member 3. The base member 7 fixedly supports a support shaft 8 about which a takeup element 9 is pivotably mounted. The takeup element 9 defines a cable insert hole and a cable winding groove so as to connect and wind the inner cable 6a of the change-speed control cable 6. Accordingly, as the winder member 9 is pivoted, the inner cable 6a is wound about or unwound from this takeup element 9. Further, the takeup element 9 is biased in a cable-unwinding pivotal direction by means of an unwinding spring 10. Consequently, by the urging force of the unwinding spring 10 and by an urging force transmitted through the cable 6 from the bicycle derailleur, the takeup element 9 is pivoted for a cable unwinding operation.

Referring back to FIG. 1, the change-speed control lever 4 has an 'L'-like configuration with the first control portion 4a and the second control portion 4b extending substantially normal to each other. In the instant embodiment, when the first control portion 4a of the control lever 4 is pivoted in the direction A which is a downward direction relative to the bicycle, a shift-up operation to a higher speed position is realized. Conversely, when the second control portion 4b of the same control lever 4 is pivoted in the further direction B, a shift-down operation to a lower speed position is realized. A return spring 11 (see FIG. 3) is provided for urging the control lever 4 to its home position denoted by a reference mark N1 in FIG. 6. Further, through a pawl support shaft 12, a feed pawl 13 is pivotably attached to the control lever 4. As this feed pawl 13 is pivoted about the support shaft 12, the pawl 13 comes into or out of engagement with a ratchet tooth 19a or 19b or a stop portion 19c formed in an outer periphery of a positioning member 19 (see FIG. 13) which member is engaged with one axial end region of the takeup element 9 to be unrotatable relative thereto. A pawl spring 20 is provided for biasing the feed pawl 13 for the engagement with the ratchet tooth 19a or 19b or the stop portion 19c.

As shown in FIG. 3, a first positioning pawl or portion 15 and a second positioning pawl or portion 16 are provided to be pivotable about a common pawl support shaft 14 supported to the base member 7. Then, these positioning pawls 15, 16 and a pawl spring 17 affecting on the first positioning pawl 15 together constitute a position hold mechanism 18 for the winder member 9. This position hold mechanism 18 is operable to hold the takeup element 9 in position at one of the first through seventh speed positions against the urging force of the return spring 10 and from the derailleur and is operable also to release its position-hold condition to allow the takeup element 9 to effect a cable winding or cable unwinding operation.

In short, as the first positioning pawl 15 and the second positioning pawl 16 are pivoted about the pawl support shaft 14, the pawls 15, 16 are engaged with or disengaged from the ratchet teeth 19a, 19b or the stop portion 19c. And, the pawl spring 17 urges the first positioning pawl 15 in the engaging direction. The ratchet tooth 19b has a tooth height greater than that of the ratchet tooth 19a and corresponds to the fourth speed position in this embodiment. Whereas, a plurality of the ratchet teeth 19a are provided in respective correspondence with the other speed positions than the first and fourth speed positions. Namely, the stop portion 19c corresponds to the first speed position. Then, as the first positioning pawl 15 comes into engagement with one of the ratchet teeth 19a, 19b or with the stop portion 19c, the first positioning pawl 15 stops further rotation of the winder member 9. That is to say, as the first positioning pawl 15 stops rotation of the winder member 9 in the unwinding direction against the urging forces of the return spring 10 or of the derailleur, the position hold mechanism 18 is rendered into its operative condition to hold the takeup element 9 in position at one of the first through seventh speed positions. Then, when the first positioning pawl 15 and the second positioning pawl 16 are disengaged from the ratchet teeth 19a, 19b or the stopper portion 19c, the takeup element 9 is released from the pawls 15, 16, so that the position hold mechanism 18 is rendered into its inoperative releasing condition to allow the winder member 9 to be rotated in the cable unwinding direction by the urging force of the return spring 10 and the urging force from the derailleur. On the other hand, when the takeup element 9 is pivoted in the cable winding direction, the pivoting movement of the winder member in this direction is allowed by the shaping arrangement of the ratchet teeth 19a, 19b which is adapted to push up the positioning pawl 15, 16 away from the teeth 19a, 19b. Upon this pivotal movement of the takeup element, however, because of the urging force of the pawl spring 17 effective on the first positioning pawl 15 for the engagement with the ratchet teeth 19a, 19b, this first positioning pawl 15 again comes into engagement with one of the ratchet teeth 19a, 19b, whereby the position hold mechanism 18 becomes operative again.

Figure 7:
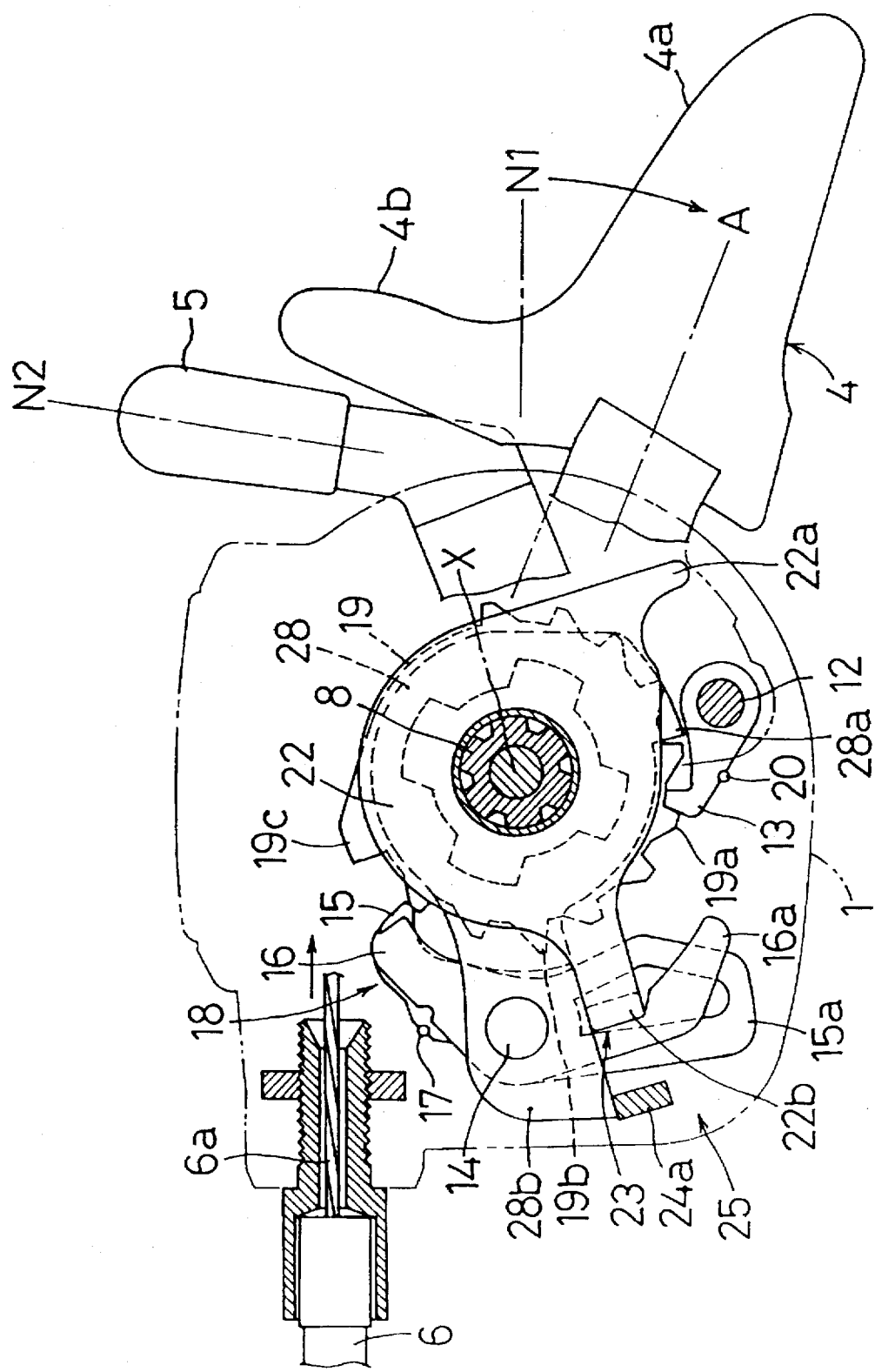
FIG. 7 shows the mechanism of FIG. 6 under a further condition where the change-speed control lever is pivoted in an 'A' direction.

As illustrated in FIG. 7, when the change-speed control lever 4 is pivoted from the home position N1 in the direction A by pressing the first control portion 4a, the feed pawl 13 becomes disengaged from a guide portion 28a of a guide member 28 shown in FIG. 13, and then the pawl 13 immediately comes into engagement with one of the ratchet teeth 19a, 19b by means of an urging force of a spring 20 and moves under this engaged state in the pivoting direction of the change-speed control lever 4. As a result, the winder member 9 is pivoted in the winding direction while disengaging the first and the second positioning pawls 15, 16 from the ratchet teeth 19a, 19b, respectively. With this, the position retaining mechanism 18 becomes inoperative to allow further pivotal movement of the takeup element 9 to wind the inner cable 6a. When the change-speed control lever 4 is pivoted by a predetermined angle and the takeup element 9 has moved by a stroke corresponding to one higher speed step, the first positioning pawl 15 automatically comes into engagement with any one of the ratchet teeth 19a, 19b or the stopper portion 19c by the urging force of the pawl spring 17, whereby the position hold mechanism 18 is automatically returned to the operative state. Accordingly, when the cyclist releases the operating force to the change-speed control lever 4, the position hold mechanism maintains the new speed position against the urging forces of the return spring 10 and from the derailleur. Thereafter, with the release of the operating force to the control lever 4, this control lever 4 is automatically returned to its home position N1 by the urging force of the return spring 11. In this way, in the change-speed operation in the cable winding direction, the first positioning pawl 15 comes into engagement with the ratchet teeth 19a, 19b with each change in the speed position. In addition, by pivoting the control lever 4 by a greater amount, the winder member 9 may be pivoted to effect a change speed operation by two speed steps at one time. Thus, the apparatus allows the single step change-speed operation by pivoting the change-speed control lever 4 in the direction A for one operational stroke from the home position N1 and allows also the double step change-speed operation by pivoting the control lever 4 in the same direction for two operational strokes at one time.

Incidentally, for the return spring 11 to provide the urging force to the change-speed control lever 4, one terminal end of the return spring 11 is supported by a spring receiver 21 which in turn is supported by the support shaft 8. Further, the guide member 28 is fixed in position as being supported by the support shaft 8 and the pawl support shaft 14.

A first release control mechanism 23 includes a first release member 22 (see FIG. 13) pivotably attached to the support shaft 8 between the winder member 9 and the change-speed control lever 4. A second release control mechanism 25 includes a second release member 24 (see FIG. 13) pivotably attached to the support shaft 8 between the takeup element 9 and the change-speed control lever 4. This second release control mechanism 25 is actuated by the control lever 4 and the release lever 5 to release the position retaining mechanism 18 thereby to allow an unwinding operation of the inner cable 6a by an operation of the second control portion 4b or the release lever 5. Further, in case the change-speed operation is effected by the second control portion 4b, the speed is changed by one step with each operation on this second control portion 4b. On the other hand, in case the change-speed operation is effected by the release lever 5, the speed is changed to the fourth or first speed position with one stroke operation of this release lever 5. As shown in FIG. 1, the release lever 5 is disposed in the vicinity of the second control portion 4b of the change-speed control lever 4 for the sake of the cyclist's convenience. Yet, this adjacent arrangement of these two levers is not absolutely necessary.

Figure 6:
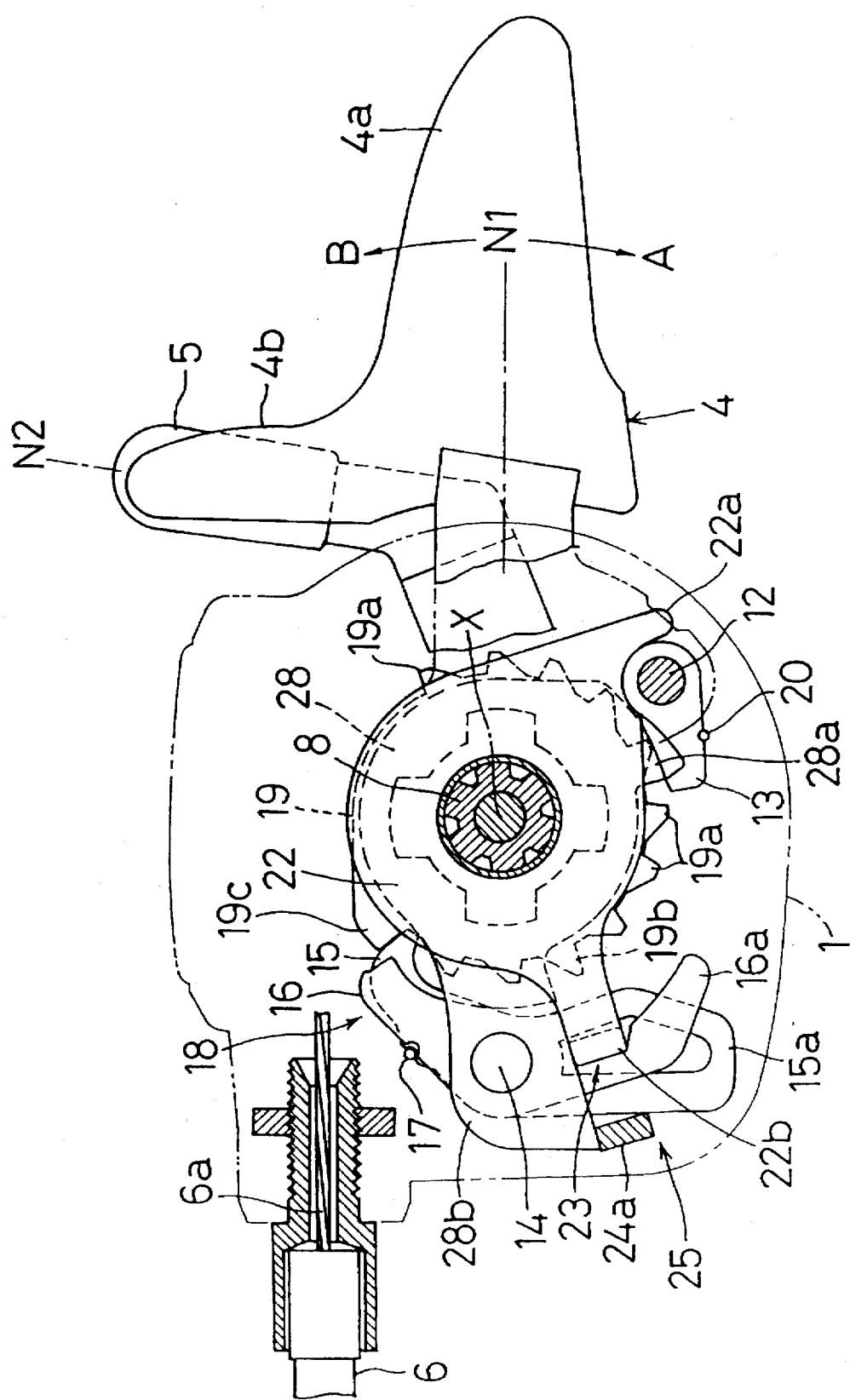
FIG. 6 shows a main mechanism of the apparatus with un-essential portions thereof being eliminated from the view for the purpose of clarity, the mechanism being under a condition where a change-speed control lever and a release lever are at respective home positions.

That is, the first release control mechanism 23 consists essentially of the first release member 22 and a return spring 26 affecting this first release member 22. The first release member 22 includes a first arm portion 22a contacting a base end of the feed pawl 13 and a second arm portion 22b which affects an arm portion 15a of the first positioning pawl 15 and an arm portion 16a of the second positioning pawl 16. Further, as shown in FIG. 6, a return spring 26 is provided for providing an urging force to automatically return the first release member 22 to its home position where the second arm portion 22b is in abutment against a portion of the pawl support shaft 14 to which the first positioning pawl 15 and the second positioning pawl 16 are attached. Accordingly, the first release control mechanism 23 is actuatable by operating the second control portion 4b of the change-speed control lever 4. Then, with this actuation of the first release control mechanism 23, the takeup element 9 is automatically pivoted in the unwinding direction to effect a one-step speed reduction from the previous position to the new position.

Figure 8:
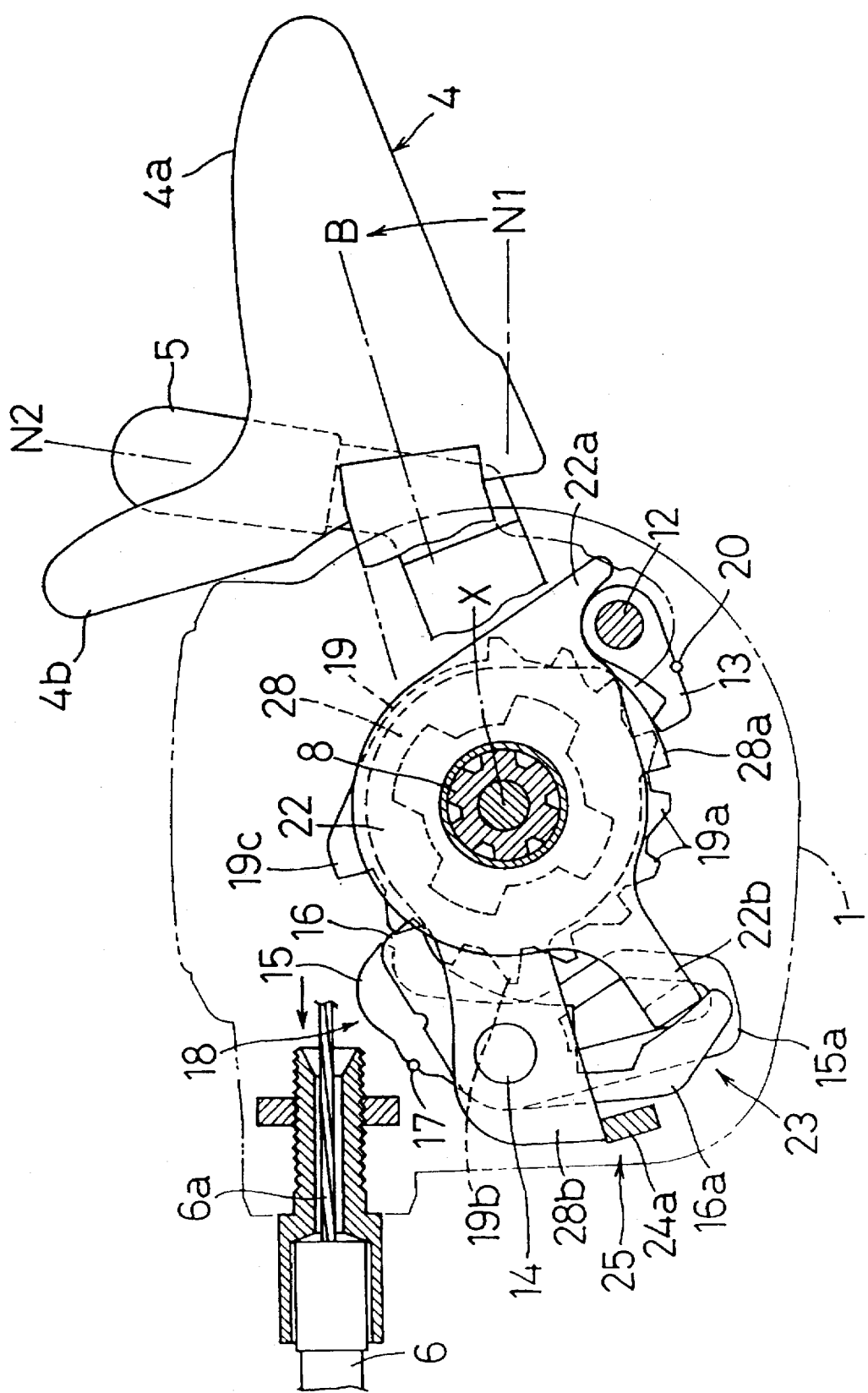
FIG. 8 shows the mechanism of FIG. 6 under a still further condition where the change-speed control lever is pivoted in a 'B' direction.
Figure 11:
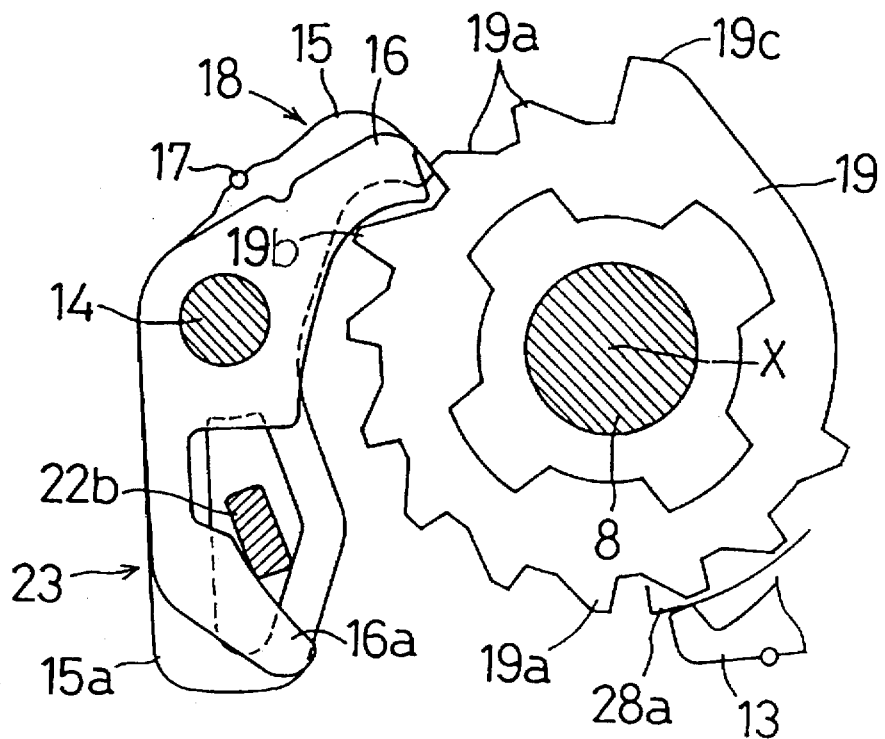
FIG. 11 shows a positioning mechanism and elements around the same under a condition where a first release member is inoperative.
Figure 12:
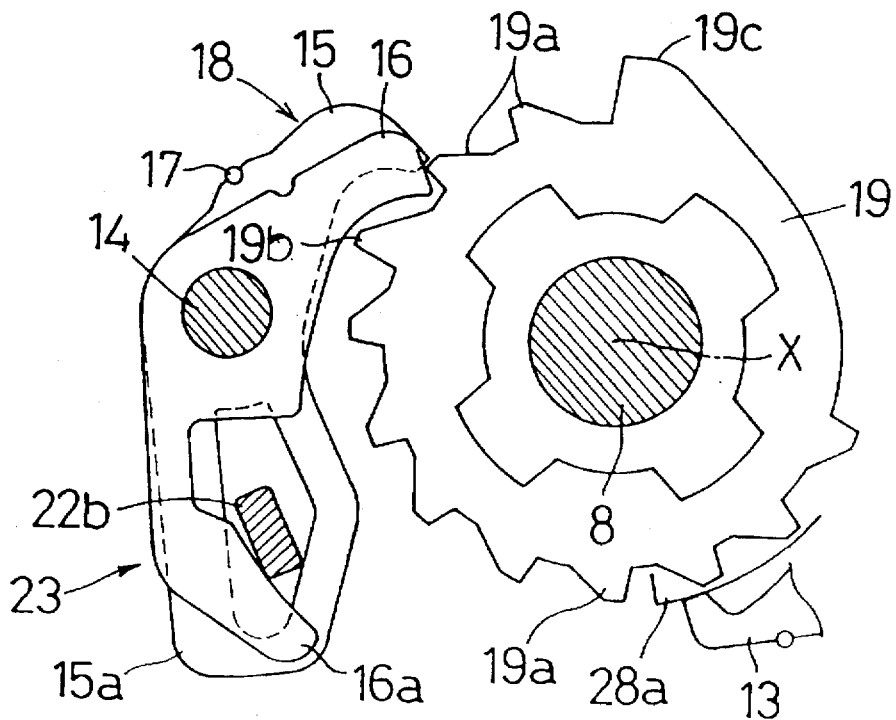
FIG. 12 shows the position mechanism and the surrounding elements of FIG. 11 under a further condition where the first release member is operative.

More particularly, as shown in FIG. 8, when the change-speed control lever 4 is pivoted in the direction B by pressing its second control portion 4b in this direction, the feed pawl 13 is riding over the guide portion 28a and disengaged from the ratchet tooth 19a. Concurrently therewith, the base portion of the feed pawl 13 comes into contact with the first arm portion 22a of the first release member 22, so that by the first release member 22 is pivoted in the same direction as the control lever 4 by the lever-operating force transmitted through the pawl support shaft 12 and the feed pawl 13. With this, the second arm portion 22b of the first release member 22 is moved from the position shown in FIG. 11 to the further position shown in FIG. 12 to press the arm portion 15a of the first positioning pawl 15, so that the first positioning pawl 15 becomes disengaged from the ratchet tooth 19a or 19b and the takeup element 9 is slightly pivoted in the unwinding direction by the urging forces of the return spring 10 and the derailleur. As a result, when the first positioning pawl 15 is actuated for next engagement, this next engagement takes place with the subsequent ratchet tooth 19a or 19b disposed adjacent the ratchet tooth 19a or 19b with which the pawl 15 was previously engaged. Further, in the course of the above, as illustrated in FIG. 12, the second arm portion 22b of the first release member 22 presses also the arm portion 16a of the second positioning pawl 16, so that the second positioning pawl 16 comes into engagement with said ratchet tooth 19a or 19b with which the first positioning pawl 15 was previously engaged.

That is to say, when the first positioning pawl 15 becomes disengaged from the ratchet tooth 19a or 19b to allow the takeup element 9 to pivot in the unwinding direction, the second positioning pawl 16 comes into engagement with the ratchet tooth 19a or 19b just disengaged from the first positioning pawl 15, thereby to restrict the angle of the pivotal movement of the winder member 9 for preventing excessive pivoting of this winder member 9. Thereafter, with release of the operating force to the second control portion 4b, the change-speed control lever 4 is returned to the home position N1 by the urging force of the return spring 26 effective on the control lever 4 through the first release member 22. Then, the first release member 22 is returned to its home position to cause the second arm portion 22b to release its pressing force onto the arm portions 16a, 15a. At this instant, although the first positioning pawl 15 is urged by the pawl spring 17 to be pivoted toward the ratchet tooth 19a or 19b, the leading end of the first positioning pawl 15 is located at a position just riding on the ratchet tooth 19a or 19b and is not yet engaged with the next ratchet tooth 19a, 19b or the stopper portion 19c. Further, the second positioning pawl 16 is released from the pressing force from the second arm portion 22b corresponding thereto, such that with the pivotal movement of the ratchet tooth 19a, 19b in the unwinding direction the second positioning pawl 16 is pushed out of the engagement thereto so as to allow the unwinding pivotal movement of the takeup element 9. Accordingly, the position hold mechanism 18 is substantially at its inoperative releasing state. Further, in this condition, even when the change-speed control lever 4 is returned to the home position N1, the feed pawl 13 is located at a position riding on the leading end of the guide portion 28a and away from the ratchet tooth 19a. Thus, the takeup element 9 is automatically pivoted in the unwinding direction by the urging forces of the return spring 10 and the derailleur, while pushing the second positioning pawl 16 out of engagement from the ratchet tooth 19a, 19b. In the course of this, the pawl spring 17 provides the urging force for the first positioning pawl 15 to automatically come into engagement with the next ratchet tooth 19a, 19b adjacent to the tooth 19a, 19b previously engaged with the pawl 15. Thus, when the winder member 9 is pivoted for one speed step unwinding operation, the first positioning pawl 15 stops the predetermined ratchet tooth 19a or 19b, thereby to automatically return the position hold mechanism 18 to the operative state to stop the unwinding pivotal movement of the winder member 9. This completes the change speed operation to one step lower speed position.

The second release member 24 includes an arm portion 24a affecting the arm portion 15a of the first positioning pawl 15. Also, as shown in FIG. 8, the return spring 27 urges this second release member 24 to cause this member 24 to automatically return to the home position where the arm portion 24a comes into contact with the stopper portion 28b of the guide member 28. Then, as the release lever 5 is formed by a portion of the second release member 24, when the takeup element 9 is located at one of the fifth, sixth and seventh speed positions, this second release member 24 is actuatable by operating the release lever 5 to a first release position Z1 of FIG. 9 distant by a predetermined angle in the direction B from the home position N2. With this actuation of the second release member 24, the winder member 9 is automatically shifted from the seventh, sixth or fifth speed position to the fourth speed position. On the other hand, when the takeup element 9 is located at one of the first through fourth speed positions, by operating the release lever 5 from the home position N2 to either the first release position Z1 or to a second release position Z2 shown in FIG. 9 distant from the first release position Z1 in the direction B, the second release member 24 is actuated this time to shift the takeup element to the first speed position.

Figure 9:
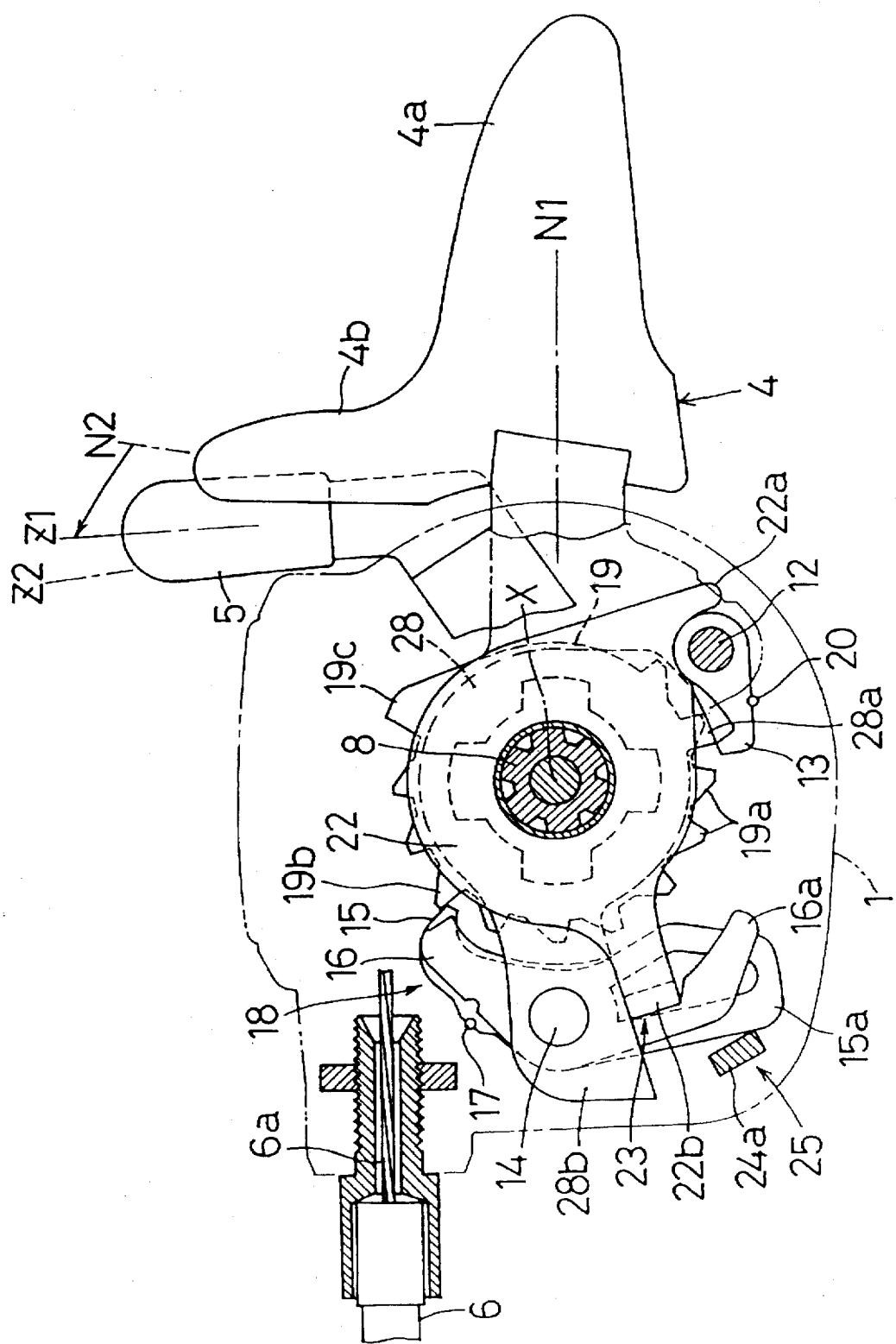
FIG. 9 shows the mechanism of FIG. 6 under a still further condition where the release lever is pivoted to a position Z1.

More particularly, in case the takeup element 9 is located at one of the fifth, sixth and seventh speed positions, as shown in FIG. 9, if the release lever 5 is operated from the home position N2 to the above-described first release position Z1, the arm portion 24a of the second release member 24 presses the arm portion 15a of the first positioning pawl 15, so that the first positioning pawl 15 assumes a first posture disengaged from the ratchet tooth 19a which comprises the tooth having the shorter height than the other between the ratchet teeth 19a, 19b. In this, while the arm portion 24a of the second release member 24 does not provide any pressing force against the arm portion 16a of the second positioning pawl 16, this second positioning pawl 16 becomes pushed away by the ratchet tooth 19a or 19b when this ratchet tooth 19a or 19b is pivoted in the unwinding direction, so that the winder member 9 is allowed to pivot in the unwinding direction to render the position hold mechanism 18 into the inoperative releasing state. Further, in the course of this, since the change-speed control lever 4 is located at the home position N1 and the feed pawl 13 is riding on the guide portion 28a to be disengaged from the ratchet tooth 19a, the winder member 9 is automatically pivoted in the unwinding direction by the urging forces of the return spring 10 and the derailleur. Then, in association with this unwinding pivotal movement of the takeup element 9 to unwind the inner cable 6a by a predetermined length, the ratchet tooth 19b which has the longer height than the other between the teeth 19a, 19b comes into contact with the first positioning pawl 15 assuming the first posture, so that the position hold mechanism 18 is automatically returned to its operative state to stop further unwinding pivotal movement of the winder member 9. As the higher ratchet tooth 19b is so formed as to set the takeup element 9 to the fourth speed position through the contact with the first positioning pawl 15, the takeup element 9 is shifted from the previous seventh or sixth speed position to the fifth or fourth speed position.

Figure 10:
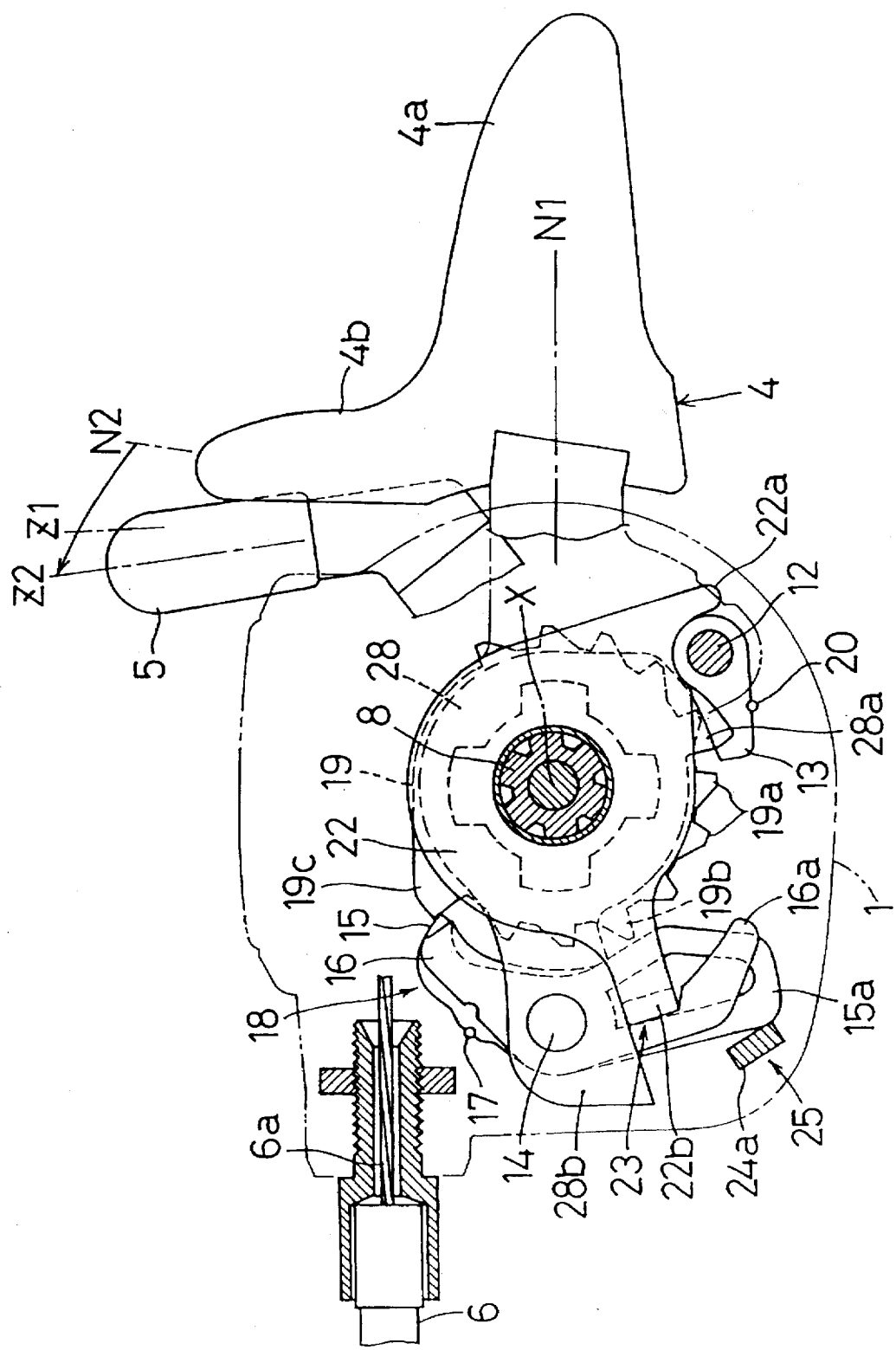
FIG. 10 shows the mechanism of FIG. 6 under a still further condition where the release lever is pivoted to a further position Z2.

In case the takeup element 9 is currently located at the fourth speed position, as illustrated in FIG. 10, if the release lever 5 is operated from the home position N2 to the second release position Z2, the arm portion 24a of the second release member 24 presses the arm portion 15a of the first positioning pawl 15, so that the first positioning pawl 15 assumes a second posture disengaged from the higher ratchet tooth 19b. In this, although the arm portion 24a of the second release member 24 does not provide any pressing force against the arm portion 16a of the second positioning pawl 16, this second positioning pawl 16 becomes pushed away by the ratchet tooth 19a or 19b when this ratchet tooth 19a or 19b is pivoted in the unwinding direction, so that the takeup element 9 is allowed to pivot in the unwinding direction to render the position hold mechanism 18 into the inoperative releasing state. Then, in association with this unwinding pivotal movement of the takeup element 9 to unwind the inner cable 6a by the predetermined length, the stopper portion 19c of the positioning member 19 comes into contact with the first positioning pawl 15 assuming the second posture, so that the position hold mechanism 18 is automatically returned to its operative state to stop further unwinding pivotal movement of the takeup element 9. As the stopper portion 19c is so formed as to set the winder member 9 to the first speed position through the contact with the first positioning pawl 15, the winder member 9 is shifted from the previous fourth speed position to the first speed position.

In case the takeup element is currently located at either the third speed position or the second speed position, the release lever 5 is pivoted from the first release position Z1 to the second release position Z2. With this, like the afore-described case, the first positioning pawl 15 assumes the first or second posture to render the position hold mechanism 18 into the inoperative releasing state, so that the takeup element 9 is automatically pivoted in the unwinding direction by the urging forces of the return spring 10 and the derailleur. Then, in association with the unwinding pivotal movement of the winder member 9 to unwind the inner cable 6a by the predetermined length, the stopper portion 19c of the positioning member 19 comes into contact with the first positioning pawl 15 assuming either the first or second posture, such that the position retaining mechanism 18 is automatically returned to the operative state and the winder member 9 stops pivoting in the unwinding direction to assume the first speed position. In either case, by releasing the operating force to the release lever 5 after the takeup element 9 has assumed the fourth or first speed position, the release lever 5 is automatically returned to the home position N2. Incidentally, one terminal ends of the return springs 26, 27 are supported to the spring receiver 29 which is supported to the support shaft 18, so that the return spring 26 urges the first release member 22 while the return spring 27 urges the second release member 24.

Figure 2:
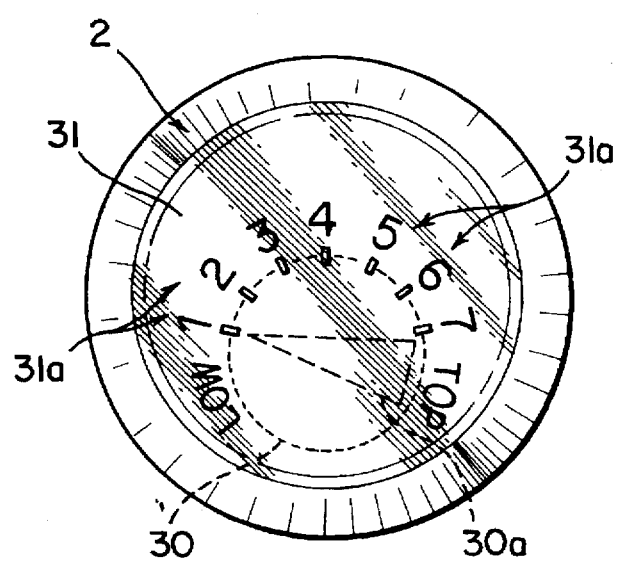
FIG. 2 is a front view showing only an indicator unit of the control apparatus of FIG. 1.
Figure 5:
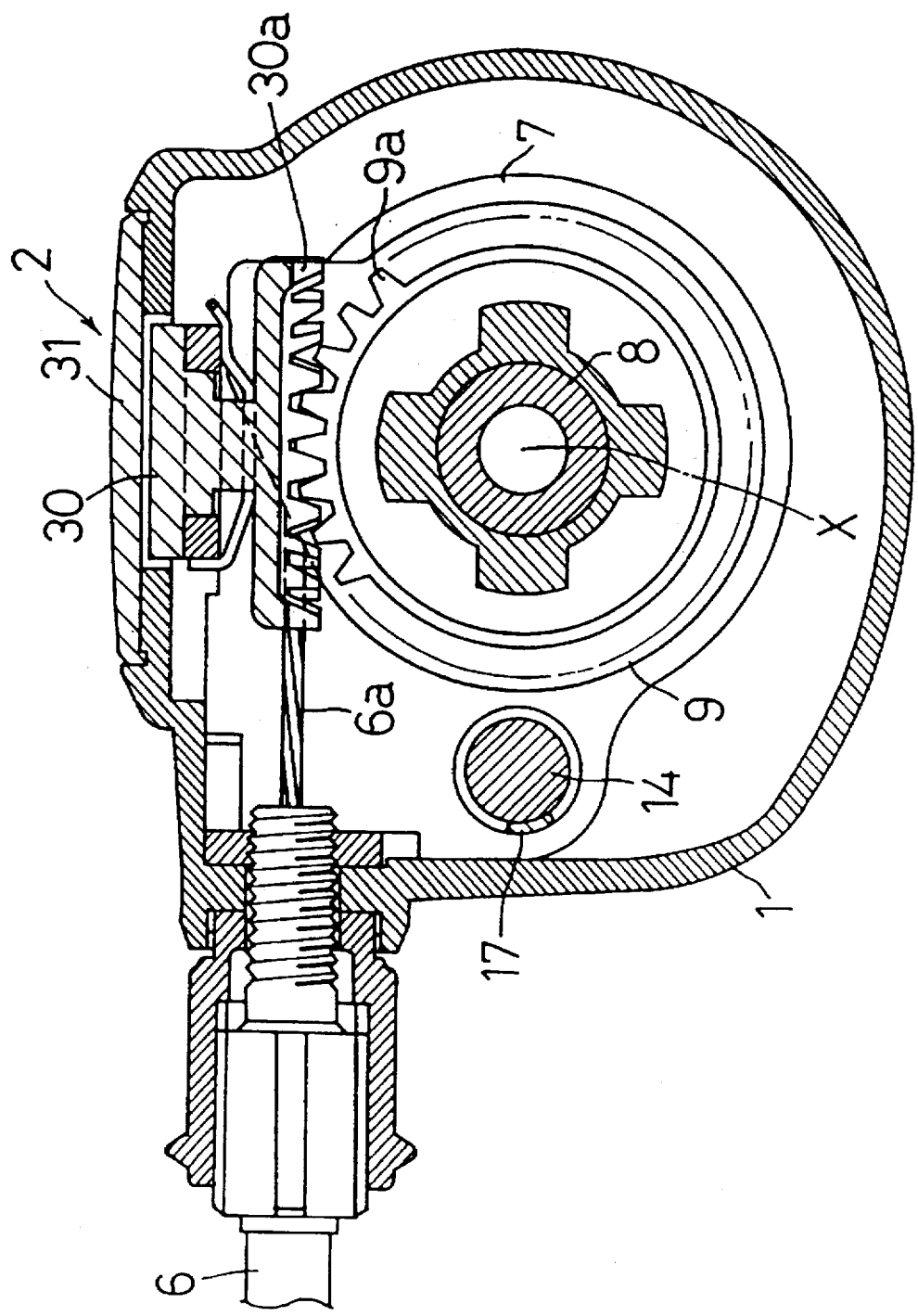
FIG. 5 is a section view of the apparatus of FIG. 1 taken along the X axis.

As shown in FIGS. 4 and 5, the indicator unit 2 includes a pointer member 30 disposed inside the body cover 1 and a display member 31 formed of a transparent material and attached on the upper face of the body cover 1. The pointer member 30 is rotatably attached to the base member 7 and is operatively connected with the takeup element 9 through meshing between a gear portion 30a of the pointer member 30 and a toothed portion 9a of the takeup element 9. Further, as shown in FIG. 2, on the upper face of the pointer member 30, there is provided a pointer needle 30a, and the display member 31 has index number marks 31a . . . to indicate the first through seventh speed positions.

In operation, with a change-speed operation, the pivotal movement of the takeup element 9 associated therewith causes a pivotal movement of the pointer member 30 to indicate one of the index number marks 31a. Accordingly, by checking the number mark indicated by the pointer needle 30a, the cyclist can learn the present speed position.

The above-described indicator unit 2 is not essential and the invention may be embodied without this indicator unit 2.

(Other Embodiments)

The control portion for operating the change-speed control lever 4 in the cable unwinding direction may be formed as an independent member provided separately from the control lever 4 and associated with this control lever 4 through a connecting mechanism. Also, the release lever 5 may be formed as an independent lever member provided separately from the second release member 24 and associated with this release member 24 through a connecting mechanism. Accordingly, the second control portion 4b is referred herein as a first unwinding lever 4b, the release lever 5 is referred herein as a second unwinding lever 5, and further the second release member 24 is referred to as a second unwinding mechanism 24.

It is conceivable to adapt a single release lever to be operable both in a first direction and in a second direction different from the first direction and also to operatively connect this release lever with both the first and second unwinding mechanisms, so that the first unwinding mechanism may be operated by an operation of the release lever in the first direction while the second unwinding mechanism may be operated by an operation of the lever in the second direction. In this way, it is conceivable to adapt the single release lever to operate both the first and second unwinding mechanisms.

The present invention may be embodied as a change-speed control apparatus for providing more than eight or less than six speed positions, instead of the apparatus of the foregoing embodiment adapted for the seven speed position arrangement. Further, the highest speed position may correspond to the position where the cable is wound by a maximum length while corresponding the lowest speed position to the position where the unwinding length of the cable is maximum. The reverse arrangement is also possible where the lowest speed position corresponds to the position where the winding length of the cable is maximum while the highest speed position corresponds to the position where the unwinding length of the cable is maximum. Moreover, the predetermined speed position to which the takeup element is pivoted in the unwinding direction by operation of the second release mechanism may be conveniently determined, depending on the desired object of the second release mechanism or on the specific requirement of the derailleur to be used in combination with the change-speed control apparatus. For instance, if the second release mechanism is used for shifting the derailleur to the starting speed position and the fourth speed position of this derailleur corresponds to the starting speed position, then, the predetermined position to which the winder member is shifted by the second release mechanism will correspond to the fourth speed position. Similarly, if the third position of the derailleur corresponds to the starting speed position, the predetermined position will correspond to the third speed position. Any other speed position may be designated as the predetermined position, or a plurality of speed positions may be designated as the predetermined positions.

Accordingly, the first speed position is referred herein as a maximum unwinding position, the seventh speed position is referred to as a maximum winding position and the fourth speed position of the winder member is referred to as the predetermined speed position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which become within the meaning and range of equivalency of the claims are therefore intended to be embraced therein.

What is claimed is:

1. A change-speed control apparatus for a bicycle comprising:
    a fixing member,
    a takeup element which pivots around a first axis to wind a change-speed control cable, the takeup element being urged in a cable unwinding direction;
    a position hold mechanism for holding said takeup element in position at one of a plurality of speed positions;
    a position-hold release means for releasing said position hold mechanism;
    a change-speed control means for pivoting said takeup element and for actuating said position-hold release means, said change-speed control means including:
        a change-speed control lever operated by a rider, and a release lever, separate from said change-speed control lever, and operated by a rider independently from said change-speed control lever; and
    said position-hold release means including:
        a first release control means, actuated by said change-speed control lever, for allowing said takeup element to pivot in the cable unwinding direction by an amount corresponding to one speed position in response to one stroke of the change-speed control lever and for allowing said takeup element to pivot in the cable unwinding direction by an amount corresponding to a number of speed positions when said change-speed control lever is actuated a number of strokes, and
        a second release control means, actuated by said release lever, for allowing said takeup element to pivot in the cable unwinding direction to a predetermined one of said speed positions.

2. A change-speed control apparatus according to claim 1, wherein said change-speed control lever causes said takeup element to wind the change-speed control cable by pivoting in a first direction while said change-speed control lever actuates said first release control means by pivoting in a second direction opposite said first direction.

3. A change-speed control apparatus according to claim 1, wherein said change-speed control lever is urged to a home position and is returned to said home position after actuation.

4. The change-speed control apparatus of claim 3, wherein said change-speed control lever is urged to the homme position by a spring.

5. A change-speed control apparatus according to claim 1, wherein said release lever is urged to a home position and is returned to said home position after actuation.

6. The change-speed control apparatus of claim 5, wherein said release lever is urged to the home position by a spring.

7. A change-speed control apparatus according to claim 1, further comprising:
    a ratchet tooth which rotates in unison with said takeup element.

8. A change speed control apparatus according to claim 7, wherein said change-speed control means further includes a ratchet pawl, operated by said change speed control lever, which engages said ratchet tooth.

9. A change-speed control apparatus according to claim 8, wherein said ratchet pawl of the change-speed control lever unit pivots about a second pivot axis extending substantially parallel with said first pivot axis and is urged for engagement with said ratchet tooth.

10. A change-speed control apparatus according to claim 7, wherein said ratchet tooth includes a plurality of teeth corresponding to said plurality of speed positions.

11. A change-speed control apparatus according to claim 7, wherein said position hold mechanism includes a first positioning portion and a second positioning portion, each said positioning portion includes, at one terminal end thereof, a ratchet pawl which engages with said ratchet tooth.

12. A change-speed control apparatus according to claim 11, wherein said first and second positioning portions pivots about a third pivot axis extending substantially parallel with said first pivot axis.

13. A change-speed control apparatus according to claim 11, wherein said first and second positioning portions each includes an arm portion contacting said first release means.

14. A change-speed control apparatus according to claim 13, wherein said first release control means comes into contact with said arm portion of the first positioning portion to pivot said first positioning portion in a direction where said ratchet pawl of the first positioning portion moves away from said ratchet tooth.

15. A change-speed control apparatus according to claim 13, wherein said first release control means comes into contact with said arm portion of the second positioning portion to pivot said second positioning portion in a direction where said ratchet pawl of the second positioning portion moves closer to said ratchet tooth.

16. A change-speed control apparatus according to claim 13, wherein said second release control means comes into contact with said arm portion of the first positioning portion to pivot said first positioning portion in a direction where said ratchet pawl of the first positioning portion moves away from said ratchet tooth.

17. A change-speed control apparatus according to claim 1, wherein said second release control means further allows said takeup element to pivot to a first predetermined one of said plurality of speed positions and a second one of said plurality of said predetermined speed positions.

18. A change-speed control apparatus according to claim 17, further comprising a ratchet having a plurality of teeth each corresponding to one of said speed positions, wherein said teeth corresponding to said first and second predetermined speed positions have a greater height than the remaining teeth.

19. The change-speed control apparatus of claim 1, wherein said second release control means allows said takeup element to pivot in the cable unwinding direction by at least two speed positions.

20. The change-speed control apparatus of claim 1, wherein said second release control means allows said takeup element to pivot in the cable unwinding direction by at least three speed positions.

21. The change-speed control apparatus of claim 1, wherein the takeup element has at least four speed positions.

22. The change-speed control apparatus according to claim 2, wherein said change-speed control means consists essentially of said change-speed control lever and said release lever.

23. A change-speed control apparatus for a bicycle comprising:

a fixing member;

a takeup element which pivots about a first pivot axis to wind a change-speed control cable, the takeup element being urged in a cable unwinding direction; a change-speed control lever unit for pivoting said takeup element, said lever unit including a change-speed control lever urged to a home position thereof, said change-speed control lever being returned to said home position upon completion of each change-speed operation;

a position hold mechanism for holding said takeup element in position at one of a plurality of speed positions;

a first release control means for allowing said takeup element to pivot in the cable unwinding direction by an amount corresponding to said one of said plurality of positions in response to one stroke of the change-speed control lever and for allowing said takeup element to pivot in the cable unwinding direction by an amount corresponding to a number of speed positions when said change-speed control lever is actuated a number of strokes; and a second release control means for allowing said takeup element to pivot in the cable unwinding direction to a predetermined one of said plurality of speed positions; and a release lever provided independently of said change-speed control lever for actuating said second release control means.

24. A change-speed control apparatus for a bicycle comprising:

a fixing member, a takeup element which pivots around a first axis to wind a change-speed control cable, the takeup element being urged in a cable unwinding direction;

a position hold mechanism for holding said takeup element in position at one of a plurality of speed positions;

a position-hold release means for releasing said position hold mechanism;

a change-speed control means for pivoting said takeup element and for actuating said position-hold release means, said change-speed control means including:

a change-speed control lever operated by a rider, and a release lever, separate from said change-speed control lever, and operated independently from said change-speed control lever; and said position-hold release means including:

a first release control means, actuated by said change-speed control lever, for allowing said takeup element to pivot in the cable unwinding direction by an amount corresponding to one speed position in response to one stroke of the change-speed control lever and for allowing said takeup element to pivot in the cable unwinding direction by an amount corresponding to a number of speed positions when said change-speed control lever is actuated a number of strokes and a second release control means, actuated by one stroke of said release lever, for allowing said takeup element to pivot in the cable unwinding direction to a predetermined one of said speed positions, wherein the takeup element pivots a distance corresponding to at least three speed positions.

* * * * *